Figures 2, 5:
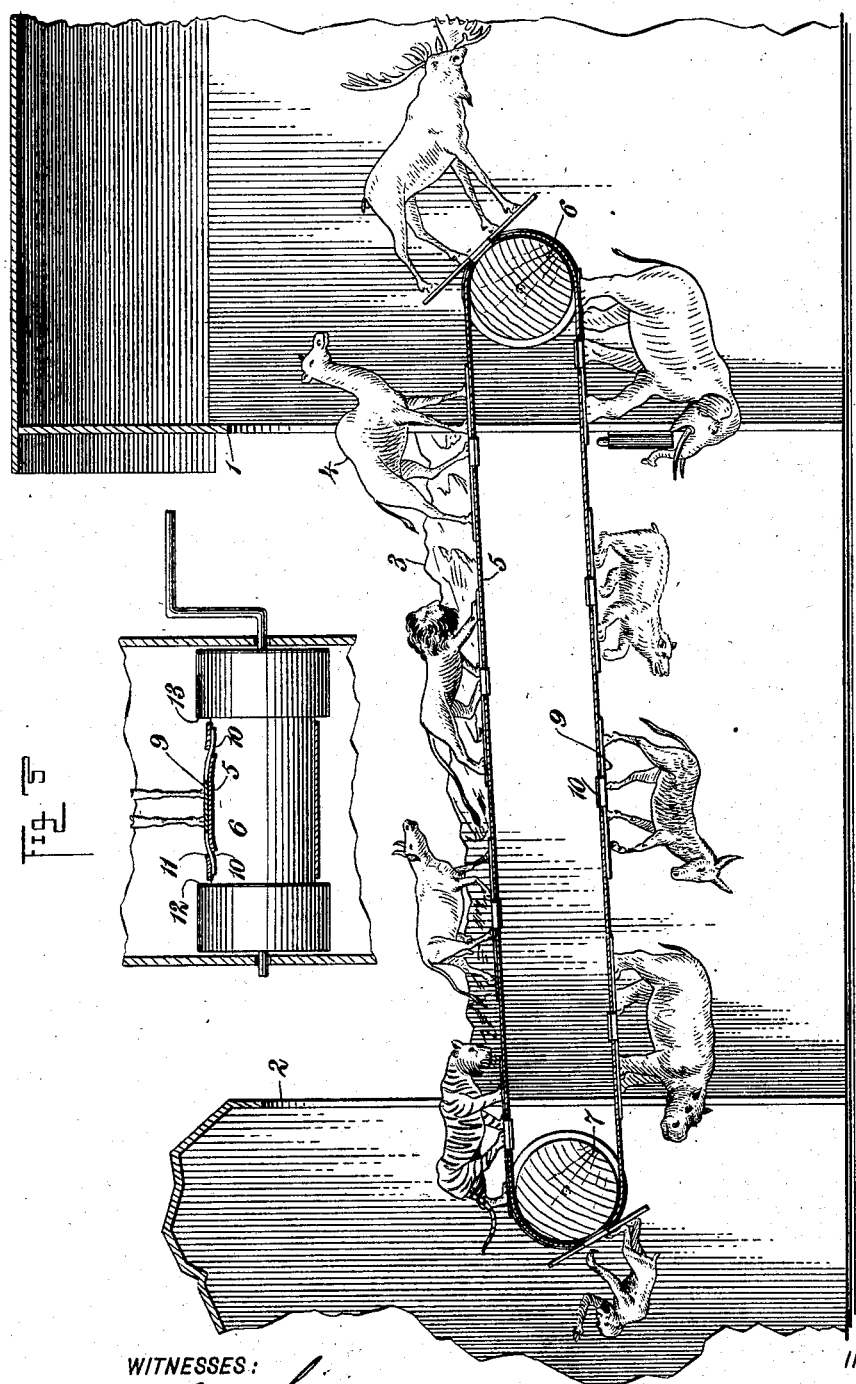

No. 698,340. Patented Apr. 22, 1902.
H. A. VANDER COOK.
TOY.
(Application filed Dec. 17, 1901.)
(No Model.) 2 Sheets—Sheet 1.
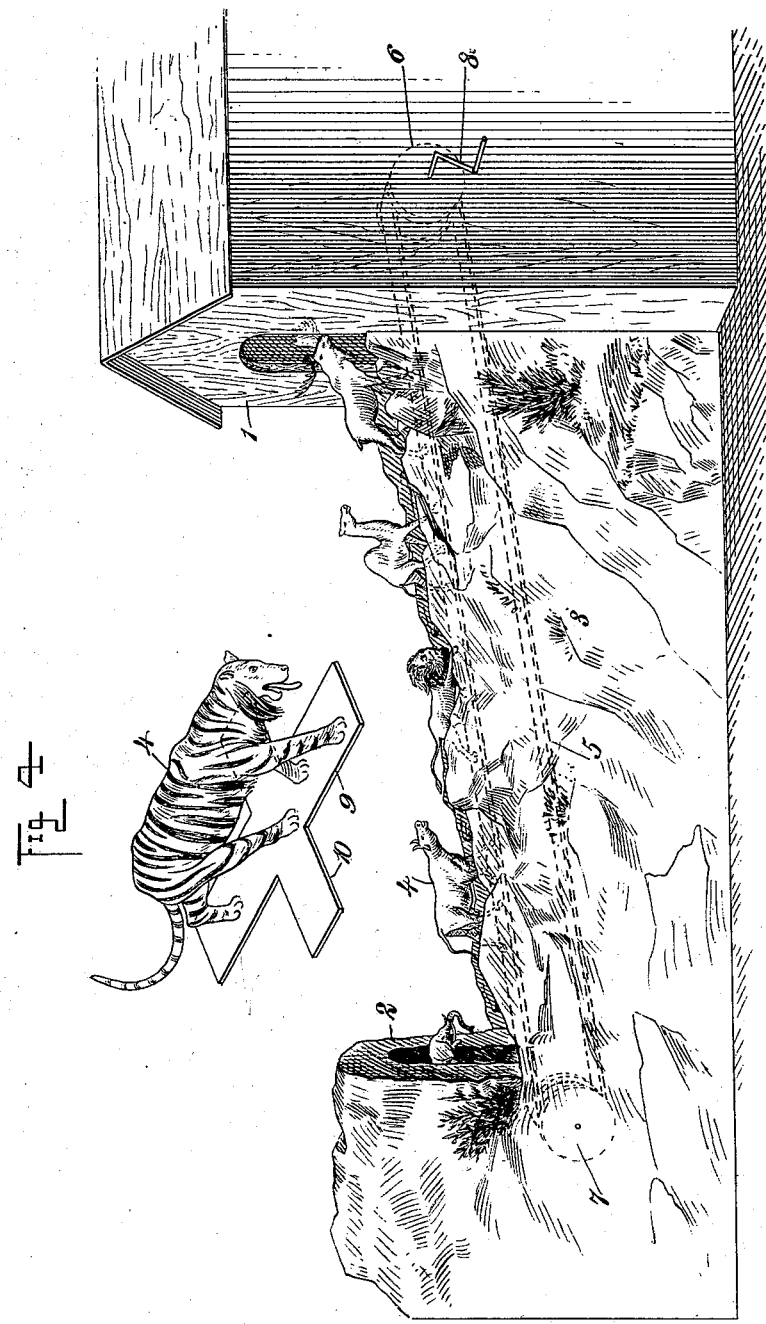
WITNESSES:
INVENTOR
Henry A. Vander Cook
BY
ATTORNEYS No. 698,340. Patented Apr. 22, 1902.
H. A. VANDER COOK.
TOY.
(Application filed Dec. 17, 1901.)
(No Model.) 2 Sheets—Sheet 2.

WITNESSES:

INVENTOR
Henry A. Vander Cook
BY
ATTORNEYS

UNITED STATES PATENT OFFICE.

HENRY ANTHONY VANDER COOK, OF CHICAGO, ILLINOIS, ASSIGNOR TO HIMSELF AND ANTHONY H. VANDERKOLK, OF CHICAGO, ILLINOIS.

TOY.

SPECIFICATION forming part of Letters Patent No. 698,340, dated April 22, 1902.

Application filed December 17, 1901. Serial No. 86,220. (No model.)

*To all whom it may concern:*

Be it known that I, HENRY ANTHONY VANDER COOK, a citizen of the United States, and a resident of Chicago, in the county of Cook and State of Illinois, have invented a new and Improved Toy, of which the following is a full, clear, and exact description.

This invention relates to improvements in toys; and the object is to provide a toy of novel construction and so arranged as to represent a series of animals or figures passing into an ark, fort, house, or other building, thus affording amusement as well as being instructive.

I will describe a toy embodying my invention and then point out the novel features in the appended claims.

Reference is to be had to the accompanying drawings, forming a part of this specification, in which similar characters of reference indicate corresponding parts in all the figures.

Figure 1 is a perspective view of a toy embodying my invention. Fig. 2 is a sectional elevation thereof. Fig. 3 is a cross-section, and Fig. 4 is a perspective view showing the manner of attaching the animals to a carrier.

Referring to the drawings, 1 designates a building, ark, or similar device, and 2 indicates a cave, which is in the form of a casing, from which the animals pass. The two parts 1 and 2 are connected by side pieces 3, which may be painted, cut out, or otherwise formed to simulate rocks. The several toy figures, such as animals 4, are mounted on an endless band or apron 5, consisting of leather, canvas, or other suitable material. This carrier 5 extends around rollers 6 7, one being arranged in the chamber or building 1, while the other is arranged within the cave. One of the rollers (here shown as the roller 6) is provided with a crank-handle 8.

The toy animals are preferably connected to the carrier, so that their order of walking may be changed at pleasure. As here shown, each animal is supported or attached to a base 9, having lateral extensions 10 to engage in openings 11, formed near the opposite edges of the carrier, as clearly indicated in Fig. 3. These lateral projections 10 are quite narrow, so that they will not interfere with the movements of the animals when rounding the rollers. In fact, these base devices may be made of cardboard or the like, so as to yield.

The operation of the device is quite obvious from the drawings—that is, by turning the crank-handle 8 the animals will be carried along and shown as passing out of the cave 2 and into the building or ark 1.

To prevent any lateral movement of the carrier, the rollers 6 and 7 are provided with shoulders 12 13 at the ends, against which the side edges of the carrier may engage.

Having thus described my invention, I claim as new and desire to secure by Letters Patent—

1. A toy, comprising two receptacles connected together by side pieces, rollers arranged in the receptacles, a carrier consisting of an endless band passing around said rollers and having slits arranged at intervals, the said band also passing between the side pieces, and toy figures having lateral projections for detachably connecting the figures to the carrier, the said projections being narrow to prevent interference with the movements of the animals when rounding the rollers, substantially as specified.

2. A toy comprising a cave-like receptacle and a receptacle indicating a building, side pieces connecting the two receptacles, rollers arranged in the receptacles, a carrier consisting of an endless band engaging around the rollers, the said band having slits or openings at intervals along its edges, a toy animal or figure, and a base on which the toy animal or figure is supported, the said base having narrow lateral projections to engage in said slits or openings, whereby interference with the movements of the animals when rounding the rollers is prevented, substantially as specified.

3. A toy, comprising two receptacles connected one with the other, rollers arranged in the receptacles, an endless band engaging around said rollers and having slits or openings arranged at intervals near opposite edges, means for turning one of said rollers, means for preventing lateral movement of the band on the rollers, toy figures, and longitudinally-extending supporting-bases for the figures each having narrow projections at its sides
5 midway between its ends and adapted to removably engage the slits or openings in the band, as specified.

In testimony whereof I have signed my name to this specification in the presence of two subscribing witnesses.

HENRY ANTHONY VANDER COOK.

Witnesses:
 BERT P. BIGGS,
 EDMUND FRANCIS.